United States Patent Office 3,354,033
Patented Nov. 21, 1967

3,354,033
COMPOSITIONS CONTAINING MONOSUBSTITUTED 2 - BROMOACETOPHENONES AND PROCESSES OF UTILIZING THE SAME
Stanley J. Buckman, John D. Pera, and Fred W. Raths, Memphis, Tenn., assignors to Buckman Laboratories, Inc., Memphis, Tenn., a corporation of Tennessee
No Drawing. Filed June 1, 1964, Ser. No. 371,836
The portion of the term of the patent subsequent to July 5, 1982, has been disclaimed
6 Claims. (Cl. 162—161)

ABSTRACT OF THE DISCLOSURE

Solutions comprising a monosubstituted 2-bromoacetophenone, a glycol ether having the formula:

$$H(OC_3H_6)_xOC_yH_{2y+1}$$

wherein $x$ and $y$ vary from 1 to 3 and 1 to 4, respectively, or an ester having the formula:

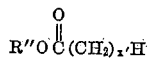

wherein $x'$ varies from 1 to 2 and $R''$ is an alkyl or an alkoxy radical and a dispersant having the formula:

$$R'—O—(RC_2H_3—O)_zH$$

wherein $z$ varies from 1 to 20, R is hydrogen or methyl and R' is an alkyl group or an alkyl benzene are useful as microbicides.

---

This invention relates to compositions and processes for treating aqueous fluids used in various industrial processes for the purpose of controlling the growth and reproduction of microorganisms and other beneficial effects. More particularly, the present invention relates to the use of a solution containing monosubstituted 2-bromoacetophenones to control slime-forming and other microorganisms in industrial processes involving water and substances that are normally susceptible to microbiological deterioration or degradation in the presence of water in which the growth and proliferation of such microorganisms interfere in the process itself or affect the quality or character of the resulting product.

Many industrial products when wet or when subjected to treatment in water are normally susceptible to bacterial or fungal degradation or deterioration. Wood pulp, starch and proteinaceous substances, animal hides, vegetable tanning liquors, and leather are all damaged or degraded by growth of bacteria and other microorganisms or by enzymes produced by such growth.

Slime consists of matted deposits of microorganisms, fibers and debris, and it may be stringy, pasty, rubbery, tapioca-like, hard, or horny and it may have a characteristic odor that is different from that of the liquid suspensions in which it is formed. The microorganisms involved in its formation are primarily different species of sporeforming and nonsporeforming bacteria, particularly capsulated forms of bacteria which secrete gelatinous substances that envelop or encase the cells. Slime microorganisms also include filamentous bacteria, filamentous fungi of the mold type, yeasts and yeastlike organisms, and to a lesser extent algae and protozoa.

Besides being objectionable from the standpoint of general cleanliness and sanitation in breweries, wineries, dairies, paper and cane sugar mills and other industrial plants or establishments, slime may interfere with the manufacturing process, such as, for example, the plugging of screens in pulp and paper systems, thus reducing overall efficiency. When large amounts of slime become incorporated in the paper sheet, its strength is reduced, and it may consequently break and require rethreading of the machine. In the paper itself, slime may be responsible for unsightly spots, holes, and odors and may produce general discoloration throughout the sheet. Growth of microorganisms in industrial water supplies, for example, in reservoirs or basins, spray ponds, or heat exchangers or in cooling towers, may produce slime or other solid accumulations which may interfere with normal flow of the water or produce plugging or complete stoppage of the flow through pipes, or, in the case of heat exchangers, reduce the rate of heat transfer. Sulfate-reducing bacteria which are generally present in waters used for secondary recovery of petroleum are objectionable if not controlled.

In an attempt to control and mitigate the growth of the microorganisms which tend to form such slimes, it is common practice to use a chemical treatment wherein various chemical compounds are added to the aqueous systems. Investigations of the slime-forming microorganisms have disclosed that numerous varieties of bacteria and fungi are the primary source of the problem and it is often necessary to control these organisms by using several different types of microbiological agents. It would be extremely advantageous if a single chemical treatment were available for the control of the numerous species of microorganisms occurring in pulp and papermill and other manufacturing processes.

Another aspect of the problem of controlling microorganisms in the pulp and papermaking industry is that the water used in the papermaking process contains quantities of cellulosic materials which vary in concentration from about 0.1 percent to 50.0 percent by weight. Many chemical microbiological agents have the tendency to be selectively absorbed by the fiber, thus in effect inactivating the inhibitor. To be effective in the control of microorganisms in pulp and paper mills, it is extremely desirable that the chemical be able to control the growth of the numerous species of microorganisms and, in addition, such agent should not be absorbed on the cellulosic fibers.

It has been proposed that certain halogenated ketones, of which 2-bromoacetophenone is a specific example, be used for the control of the microorganisms encountered in industrial process systems. While these compounds are more or less effective in the control of the microorganisms causing the production of slime, those which are most effective possess certain important disadvantages; the most serious of which is that these compounds are lachrymators. As a consequence, workmen handling these products, or solutions containing the same, must wear gas masks. Small quantities of these compounds added to agitated and heated pulp and papermill systems would volatilize or mix with warm water vapors so that the machine tenders or other workmen would also be affected. Other related compounds which have been suggested for use in agricultural applications, such as seed treatments and soil sterilants, and for the treatment of cooling water, have been the nitrosubstituted 2-bromoacetophenones. These materials are yellow in color and because of their color may cause a loss in brightness or whiteness of pulp and paper. While the lachrymatory properties of the nitro compounds are not as severe as that of the unsubstituted 2-bromoacetophenone, extreme care still is necessary when handling these compounds. Moreover, the nitrosubstituted acetophenones are severe skin irritants.

We disclosed in our copending patent application entitled "Processes for the Industrial Control of Microorganisms and Compositions for Use Therein," Ser. No. 292,094, filed July 1, 1963, now U.S. Patent 3,193,448, dated July 6, 1965, subsequently reissued as Re. 26,009, that certain monosubstituted 2-bromoacetophenones are excellent microbicides. It was also pointed out that these compounds did not possess the disadvantages usually associated with the halogenated ketones previously proposed as microbicides. Although we suggested that organic solvents such as alcohols, ketones, ethers, and esters could be used as solvents for these monosubstituted 2-bromoacetophenone, additional experimental work has since demonstrated that very few of these solvents are entirely satisfactory. For that reason, the monosubstituted 2-bromoacetophenone would ordinarily be employed as a solid although industrial users prefer a liquid to a solid, because the former can be more accurately metered or fed into a system than the latter. Moreover, a dispersible liquid dissolves in water with greater ease.

It is, therefore, a principal object of the present invention to provide a composition for the control of microorganisms and other purposes, which obviates the disadvantages of the prior art.

It is another object of this invention to provide a composition that is stable under the temperature conditions encountered in normal storage and use.

It is another object of the present invention to provide a composition that is easily dispersed in industrial aqueous process systems.

It is yet another object of our invention to provide a composition for the intensification of dyestuffs employed in dying cellulosic and other organic materials.

These and other objects and advantages of compositions and processes utilizing the compositions will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

In brief, the foregoing objects and advantages are attained by means of a composition comprising a monosubstituted 2-bromoacetophenone and a solvent which may be a glycol ether or an ester. Preferably, a dispersing agent is also added to the solution. We have found that when such a solution containing a dispersant is added to water, a stable uniform dispersion of the monosubstituted 2-bromoacetophenone can be easily obtained by merely stirring. In the absence of the dispersant, it is very difficult to prepare a satisfactory dispersion. More specifically, the foregoing objects and advantages are accomplished by adding the composition of our invention to an industrial aqueous system; whereby, for example, the growth and proliferation of microorganisms are inhibilited or the color of dyestuffs is intensified. As to the amount of the composition to be added to the aqueous fluids, suitable and preferred quantities are such as to give a concentration of the monosubstituted 2-bromoacetophenone therein varying from 0.1 to 500 p.p.m. and 0.2 to 250 p.p.m., respectively.

Before proceeding with specific examples illustrating our invention, it may be well to indicate in general the type of compounds useful in the invention.

The invention is restricted to the use of 2-bromoacetophenones which are substituted in either the meta or para position by a single hydroxy, acetoxy, or methoxy group or in the ortho position by a methoxy group. Stated another way, the substitutent group may be written as

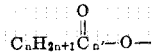

wherein $n$ and $n'$ are integers varying from 0 to 1 with the provision that when $n$ is 0, $n'$ is 0. It will thus be seen that when both $n$ and $n'$ are 0, the radical is hydroxy (—OH). And when $n$ is 1 and $n'$ is 0, the radical is methoxy (—O—CH$_3$). When $n$ and $n'$ are both 1, the radical is acetoxy.

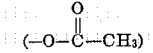

when $n$ is 1 and $n'$ is 0, the radical (methoxy) is attached at any one of the positions designated as ortho, meta, or para. When $n$ and $n'$ are each 0, the radical (hydroxy) or when $n$ and $n'$ are each 1, the radical (acetoxy) is attached at the meta or para positions. We have discovered that these substituents stabilize the 2-bromoacetophenone in both alkaline and acid systems without rendering the 2-bromoacetophenone ineffective toward microorganisms.

The two compounds substituted in the ortho position, 2-bromo-o-hydroxyacetophenone and 2-bromo-o-acetoxyacetophenone, are markedly less effective against microorganisms than is the 2-bromo-o-methoxyacetophenone. Furthermore, the greatest difference between these compounds is at pH 6.5 and 7.5. The explanation for this surprising difference is not known for certain. It is well known, however, that 2 - halogeno-o-hydroxyacetophenones react to form coumarones in the following manner:

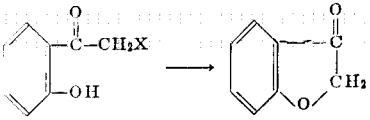

where X is a halogen. This reaction proceeds particularly smoothly in alkaline solutions. (Chemistry of Carbon Compounds, edited by E. H. Rodd, vol. IV$^a$, pp. 169 and 181, Elsevier Publishing Company, New York, 1957.) The acetoxy derivative would be subject to easy hydrolysis under these same conditions, forming the o-substituted hydroxy compound. On the other hand, the methoxy group is a stable one and will not undergo a similar reaction under ordinary conditons.

The monosubstituted 2-bromoacetaphenones used in this invention have been prepared by methods which are generally thoroughly described in the chemical literature. The most widely used method involves the bromination of the corresponding o-, m-, or p-substituted acetophenone using a molar quantity of bromine equivalent to the molar quantity of the substituted acetophenone. Solvents that may be used include carbon disulfide, chloroform and glacial acetic acid and the temperature of the reactions varies from 0 to 25° C. Since the 2-position of the acetophenone is alpha to the carbonyl group and is the most active site available for bromination, good yields of the 2-bromoacetophenones are usually obtained. In some cases, precautions must be taken to prevent ring bromination. The use of anhydrous, glacial acetic acid as the solvnt (Buu-Hoi, Xuong and Lavit, Journal of the Chemical Society, 1954, 1034–1038) directs the bromine exclusively to the 2-position, whereas the presence of even a small quantity of water causes the benzene ring to be brominated. Excess bromine must be avoided in all of the reactions to prevent polybromination.

The 2-bromoacetophenone substituted by acetoxy groups in the ring can be prepared by the reaction of the corresponding hydroxyacetophenones with an acetylating agent, such as acetic anhydride or acetyl chloride. Other methods are described in the literature, but the two methods above are the most practical.

The 2-bromoacetophenones cannot be adequately characterized by bromine analyses, because several isomers with the bromine on the ring and with identical theoretical bromine contents are possible. We used melting points, bromine analyses, ultraviolet and infrared analyses to characterize the compounds. We have found that substitution of a bromine on the 2-position of an acetophenone increases the wavelength of the carbonyl absorption band by about 5 to 15 millimicrons and decreases the magnitude of the molecular extinction coefficient about 500 to 3500. In the infrared, the absorption peak that appears at about 10.4 microns for the acetophenones is decreased to about 10.0 to 10.1 microns when the bromine is substituted in the 2-position.

In the aforementioned copending patent application, we disclosed that certain monosubstituted 2-bromoacetophenones are excellent microbicides and do not possess the disadvantages of the prior art compounds. We also disclosed that these compounds were soluble to a certain extent in various solvents. Later work has demonstrated, however, that all of the solvents disclosed were not entirely satisfactory for reasons which will be pointed out. As a matter of fact, most were unsatisfactory. This is true because the chemistry of these monosubstituted 2-bromoacetophenones is such that there are few solvents for these compounds that are satisfactory when the resultant solution is to be stored for any but a very short period of time particularly at temperatures of 50° C. and above. Alcohols, such as the aliphatic alcohols, containing from 1 to 4 carbon atoms, and tetrahydrofurfuryl alcohol are capable of dissolving the monosubstituted 2-bromoacetophenones, but the resulting solutions are unstable. As an example, we found that 21.3 percent of 2-bromo-p-hydroxyacetophenone dissolved in methanol had decomposed after two days' storage. Although solutions of monosubstituted 2-bromoacetophenones in a mixture of two alcohols, wherein one of the alcohols was tetrahydrofurfuryl alcohol and the other either propylene glycol, propanol, or isopropanol, exhibited greater stability, the improvement was a matter of degree only. When such solutions were stored at 50° C., the percentage decomposition per day of the 2-bromo-p-hydroxyacetophenone varied from about 1 to about 1.5 percent. Carboxylic acids are good solvents for these compounds, but the resulting solution is very corrosive and difficult to handle. As expected, these acetophenones are very soluble in aldehydes and ketones. Such solvents, however, are unsatisfactory because the acetophenone will undergo condensation and also bromine interchange with the solvent. Amines react to remove the bromine.

It would be expected that solutions of a monosubstituted 2-bromoacetophenone using different solvents selected from the same class would exhibit similar stability characteristics; and conversely, if the solvents were selected from different classes, the stability characteristics would be different. We found, however, much to our surprise that these expectations were not in agreement with the facts. We have discovered that a limited number of two types of organic compounds broadly classified as glycol ethers and esters, which will be identified more fully below, are not only excellent solvents for these monosubstituted bromoacetophenones, but the resulting solutions are stable, even over prolonged periods of storage at temperatures up to 50° C. and above.

More specifically, the glycol ethers particularly suitable for use in our invention are prepared by reacting propylene oxide with an aliphatic alcohol containing 1 to 4 carbon atoms. Ethers so prepared have the formula:

$$H(OC_3H_6)_xOC_yH_{2y+1}$$

where $x$ and $y$ are integers varying from 1 to 3 and 1 to 4, respectively. Specific examples of glycol ethers falling within the foregoing category and which are available commercially include propylene glycol methyl ether, dipropylene glycol methyl ether, tripropylene glycol methyl ether, and the corresponding ethyl, propyl, isopropyl and butyl ethers. It will be understood, of course, that mixtures of two or more of the foregoing ethers may also be used if desired. In contrast, it was surprising to find that solutions of monosubstituted bromoacetophenones in glycol ethers prepared by reacting ethylene oxide with the same aliphatic alcohols were unstable. Even more surprising, we found that solutions of the monosubstituted acetophenones in propylene glycol exhibited very poor stability.

Esters suitable for use in our invention are those having the formula:

where $x'$ is an integer varying from 1 to 2 and $R''$ is a straight or branched chain alkyl radical or an alkoxy substituted straight or branched chain alkyl radical containing 1 to 6 carbon atoms. Although any ester as defined above is suitable, specific esters which are preferred because they are available commercially in large quantities at a low price include methyl, ethyl, propyl, isopropyl, and butyl acetates and the corresponding propionates. In addition, and for the same reasons, methoxyethyl, ethoxyethyl, 2-(2-methoxyethoxy)ethyl, and 2-methoxypropyl acetates are equally satisfactory.

Suitable dispersants for use in our invention are classified as nonionic. More specifically, these dispersants are prepared by reacting alkylene oxide with an alkyl phenol or a hydrophobic alcohol. Somewhat more specifically, the dispersants are those prepared from alkyl phenols, wherein the alkyl group contains from 6 to 20 carbon atoms and alkylene oxide such as ethylene and propylene oxides. The amount of alkylene oxide reacted varies from about 1 to 20 moles per mole of the alkyl phenol or hydrophobic alcohol. Dispersants so prepared have the formula:

$$R'-O-(RC_2H_3-O)_zH$$

where $z$ is an integer varying from 1 to 20, R is hydrogen or methyl, and R' is a straight or branched chain alkyl-substituted benzene or a straight or branched chain alkyl radical with the alkyl radical containing from 6 to 20 carbon atoms. Chemically, these dispersants are known as alkyl phenyl polyalkylene glycol ethers when the compound is prepared from an alkyl phenol and as a polyalkylene glycol ether when the compound is prepared from a hydrophobic alcohol and alkylene oxide. The method used in preparing the alkyl phenol ethylene condensation products is described in British Patent 470,181, dated Aug. 3, 1937. Specific examples of the alkyl phenols include: 4-methyl-2-tert-octylphenol, 1,1,3,3-tetramethylbutylphenol, nonylphenol and dodecylphenol.

Suitable and preferred quantities of each of the components making up the microbicidal composition in weight percent of this invention vary as follows:

| | Suitable | Preferred |
| --- | --- | --- |
| Monosubstituted 2-bromoacetophenone | 5–50 | 25–45 |
| Dispersant | 0–95 | 25–45 |
| Solvent | 0–95 | 20–40 |

In order to disclose the nature of the invention still more clearly, the following illustrative examples will be given. It is understood, however, that the invention is not to be limited to the specific conditions or details set forth in these examples, except insofar as such limitations are specified in the appended claims.

*Example 1*

The compound 2-bromo-p-hydroxyacetophenone was dissolved in various solvents and analyzed for ionic bromide. These samples were then placed in an oven at 50° C. and analyzed at weekly intervals for ionic bromide.

The increase in the ionic bromide with time is indicative of decomposition. The results are tabulated in Table 1.

TABLE 1.—STABILITY STUDY OF 2-BROMO-P-HYDROXY-ACETOPHENONE IN VARIOUS SOLVENTS AT 50° C.

| Solvent | Percentage ionic bromide | | | |
|---|---|---|---|---|
| | Initial | 1 wk. | 2 wks. | 3 wks. |
| (A) Propylene, dipropylene, and tripropylene glycol methyl ether glycol | 0.34 | 0.10 | 0.11 | 0.15 |
| (B) Propylene glycol methyl ether | 0.35 | 0.12 | 0.15 | 0.14 |
| (C) Dipropylene glycol methyl ether | 0.34 | 0.09 | 0.10 | 0.11 |
| (D) Tripropylene glycol methyl ether | 0.34 | 0.06 | 0.08 | 0.09 |
| (E) Propylene glycol | 0.37 | 3.19 | 4.37 | 4.58 |
| (F) Dimethyl acetamide | 0.33 | 2.17 | 3.00 | 3.52 |
| (G) Methanol | 0.33 | 1.54 | 1.66 | 1.89 |
| (H) Isopropanol | 0.33 | 1.96 | 3.07 | 3.54 |
| (I) Ethyl acetate | 0.30 | 0.06 | 0.04 | 0.04 |
| (J) Hexylene glycol | 0.36 | 1.95 | 6.09 | |
| (K) Ethylene glycol | 0.37 | 3.87 | 3.39 | 3.34 |
| (L) n-Butanol | 0.35 | 3.12 | 4.14 | 4.11 |
| (M) Dimethyl formamide | 0.47 | 2.36 | 2.93 | 3.32 |
| (N) Diethylene glycol monoethyl ether | 0.36 | 1.22 | 1.15 | 1.22 |
| (O) Tetrahydro-furfuryl alcohol | 0.28 | 1.52 | 2.46 | 2.64 |
| (P) 2-Methoxyethyl acetate | 0.26 | 0.11 | 0.10 | 0.10 |
| (Q) Ethylene glycol monoethyl ether | 0.30 | 1.46 | 2.11 | 2.27 |
| (R) Isopropyl acetate | 0.34 | 0.08 | 0.08 | 0.06 |

The compositions of this invention as exemplified by samples A, B, C, D, I, P and R in Table 1 have low ionic bromide content and, therefore, very little decomposition has taken place; whereas, the other examples exhibit a high ionic bromide content and, therefore, considerable decomposition has taken place.

*Example 2*

A composition comprising on a weight basis 38 percent 2-bromo-p-hydroxyacetophenone, 35 percent of a dispersant which was formed by reacting ethylene oxide with dodecylphenol on a molar basis of 9 moles of ethylene oxide per mole of the phenol and 27 percent of a solvent which consists of a mixture of propylene, dipropylene, and tripropylene glycol methyl ethers was tested by the pulp substrate method described in U.S. Patent 2,881,070, which disclosure is hereby made a part of this application, using *Aerobacter aerogenes* and pulp substrates that were buffered to pH values of 5.5, 6.5 and 7.5, respectively. The results are tabulated in Table 2.

TABLE 2.—PERCENTAGE KILL OF *AEROBACTER AEROGENES* IN A PULP SUBSTRATE AT pH 5.5, 6.5 and 7.5 AFTER 6 HR. CONTACT WITH 2-BROMO-P-HYDROXYACETOPHENONE.

| pH | Concentration (parts per million) | Kill (percent) |
|---|---|---|
| 5.5 | 0.01 | 40 |
| | 0.05 | 21 |
| | 0.1 | 78 |
| | 0.3 | 84 |
| | 0.5 | 89 |
| | 0.7 | 85 |
| | 1.0 | 89 |
| | 2.0 | 88 |
| 6.5 | 0.1 | 45 |
| | 0.3 | 89 |
| | 0.5 | 86 |
| | 0.7 | 93 |
| | 1.0 | 88 |
| | 1.5 | 90 |
| | 2.0 | 91 |
| | 4.0 | 91 |
| 7.5 | 0.1 | 55 |
| | 0.3 | 70 |
| | 0.5 | 82 |
| | 0.7 | 87 |
| | 1.0 | 93 |
| | 1.5 | 92 |
| | 2.0 | 92 |
| | 4.0 | 91 |
| | 8.0 | 92 |

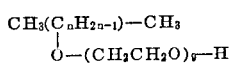

A comparable degree of kill was obtained when solutions containing the other monosubstituted 2-bromoacetophenones previously described were substituted for the 2-bromo-p-hydroxyacetophenone used in this example. The dispersant used in this example may be replaced with other dispersants such as those derived by the ethoxylation of linear secondary alcohols to give comparable results. A specific example of such dispersant is available commercially under the trademark Tergitol Nonionic 15-S-9 and has the structural formula:

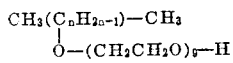

wherein $n$ varies from 9 to 13.

*Example 3*

In this example, the same composition as used in Example 2 was used in the quantities specified (based on the amount of 2-bromo-p-hydroxyacetophenone) in conjunction with the preparation of bleached white paper. The experiments together with the results are summarized below:

| Concentration, parts per million: | Brightness [1], pct. |
|---|---|
| 0 | 79.8 |
| 5 | 80.8 |
| 10 | 81.0 |

[1] Determined in accordance with Technical Association of the Pulp and Paper Industry Standard T. 452 M-58.

Similar results are obtained when solutions containing the other monosubstituted 2-bromoacetophenones previously described are used instead of 2-bromo-p-hydroxyacetophenone.

Our experiments have also disclosed that our compositions when used in the preparation of paper in amounts so as to give 5 to 10 parts of the same composition as used in Example 2 per million parts of water serve to intensify the colors produced by the dyes employed in the process. This effect is particularly pronounced when the dye used is Auramine (yellow) which is bis(4,4'-dimethylaminophenyl)iminomethane hydrochloride or Du Pont Brilliant Croceine FL (red) which is acid red 137 color index 17755. Chemically, this dye is p-aminoacetanilide coupled to acetylated 2-amino-5-naphthol-7-sulfonic acid.

In the foregoing detailed description it will be apparent that many variations may be made without departing from the spirit and scope of the invention. Thus, for example, any of the solvents and/or the dispersants disclosed above may be substituted for the specific solvent and dispersant disclosed in the examples without altering the effectiveness of the final composition. As another example, the compositions of this invention are very useful in controlling the growth and proliferation of sulfate-reducing bacteria. Many other variations will be apparent to those skilled in the art. We, therefore, intend to be limited only in accordance with the following claims.

We claim:

1. A stable water-dispersible composition of matter comprising a monosubstituted 2-bromoacetophenone having the formula:

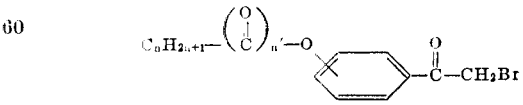

wherein $n$ and $n'$ are integers varying from 0 to 1 and when $n$ is 0, $n'$ is 0, characterized in that when $n$ is 1 and $n'$ is 0 the point of attachment is at any one of the positions designated as ortho, meta, and para and when $n$ and $n'$ are each 0 and when $n$ and $n'$ are each 1 the point of attachment is at any one of the positions designated as meta and para, a glycol ether having the formula:

$$H(OC_3H_6)_xOC_yH_{2y+1}$$

wherein $x$ and $y$ are integers varying from 1 to 3 and 1 to 4, respectively, and formed by reacting propylene oxide with an aliphatic alcohol containing from 1 to 4 carbon atoms, or an ester having the formula:

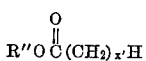

wherein $x'$ is an integer varying from 1 to 2 and R″ is selected from the group consisting of straight and branched chain alkyl radicals and alkoxy substituted straight and branched chain alkyl radicals containing from 1 to 6 carbon atoms, and a dispersant having the formula:

$$R'-O-(RC_2H_3-O)_zH$$

wherein $z$ is an integer varying from 1 to 20, R is selected from the group consisting of hydrogen and methyl, and R′ is selected from the group consisting of straight and branched chain alkyl substituted benzenes and straight and branched chain alkyl radicals, wherein the alkyl radical contains from 6 to 20 carbon atoms, characterized further in that the bromoacetophenone content varies from 5 to 50, that of the glycol ether or the ester varies from 0 to 95, and that of the dispersant varies from 0 to 95, all in percent by weight of the composition.

2. The composition of claim 1 wherein the monosubstituted 2-bromoacetophenone varies from 25 to 45, that of the glycol ether from 20 to 40, and that of the dispersant varies from 25 to 45, all in percent by weight of the composition.

3. The composition of claim 1 wherein the glycol ether is a mixture of propylene, dipropylene and tripropylene glycol methyl ether.

4. The composition of claim 1 wherein the dispersant used was formed by reacting ethylene oxide with dodecylphenol on a molar basis of 9 moles of ethylene oxide per mole of dodecylphenol.

5. The composition of claim 1 wherein the dispersant used had the formula:

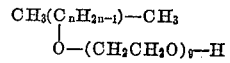

wherein $n$ varies from 9 to 13.

6. A method of inhibiting microbiological deterioration of an organic substance that is susceptible to deterioration by the action of microorganisms and inhibiting the formation of slime in aqueous fluids that are in contact with such substance which comprises adding to said aqueous fluids the composition defined in claim 1 in an amount sufficient to inhibit the growth of said microorganisms.

References Cited
UNITED STATES PATENTS

| | | | |
|---|---|---|---|
| Re. 26,009 | 5/1966 | Buckman et al. | 162—161 |
| 2,828,265 | 3/1958 | Van Strien | 252—8.55 |
| 3,184,379 | 5/1965 | Lukes et al. | 162—161 X |
| 3,193,448 | 7/1965 | Buckman et al. | 162—161 |
| 3,212,963 | 10/1965 | Wehner | 162—161 X |

S. LEON BASHORE, *Primary Examiner.*